(12) United States Patent
Miller

(10) Patent No.: US 8,333,348 B1
(45) Date of Patent: Dec. 18, 2012

(54) WING TIP LOAD ALLEVIATION DEVICE AND METHOD

(75) Inventor: Gerald D. Miller, Mercer Island, WA (US)

(73) Assignee: The Boeing Company, Chicago, IL (US)

( * ) Notice: Subject to any disclaimer, the term of this patent is extended or adjusted under 35 U.S.C. 154(b) by 301 days.

(21) Appl. No.: 12/705,691

(22) Filed: Feb. 15, 2010

(51) Int. Cl.
*B64C 23/00* (2006.01)
(52) U.S. Cl. ..................... 244/199.4; 244/198
(58) Field of Classification Search ............... 244/45 R, 244/199.2, 199.3, 199.4, 198, 46
See application file for complete search history.

(56) References Cited

U.S. PATENT DOCUMENTS

| | | | | |
|---|---|---|---|---|
| 4,247,063 | A * | 1/1981 | Jenkins | 244/91 |
| 6,227,487 | B1 * | 5/2001 | Clark | 244/99.12 |
| 6,497,600 | B1 * | 12/2002 | Levy et al. | 446/34 |
| 7,264,200 | B2 * | 9/2007 | Bussom et al. | 244/17.25 |
| 2006/0022086 | A1 * | 2/2006 | Reynolds et al. | 244/87 |
| 2007/0262199 | A1 * | 11/2007 | Shelton | 244/45 R |

OTHER PUBLICATIONS

Roland J. White, "Improving the Airplane Efficiency by Use of Wing Maneuver Load Alleviation", AIAA Paper No. 70-877, Canadian Aeronautics and Space Institute and American Institute of Aeronautics and Astronautics Meeting on the Prospects for Improvement in Efficiency of Flight, Toronto, Canada, Jul. 9-10, 1970, pp. 1-8.
T.E. Disney, "The C-5A Active Load Alleviation System", AIAA Paper No. 75-991, American Institute of Aeronautics and Astronautics 1975 Aircraft Systems and Technology Meeting, Los Angeles, California, Aug. 4-7, 1975, pp. 1-8.
Woods-Vedeler, et al., "Rolling Maneuver Load Alleviation Using Active Controls", AIAA-92-2099-CP, American Institute of Aeronautics and Astronautics, 1992, pp. 172-180.
Woods-Vedeler, et al., "Rolling Maneuver Load Alleviation Using Active Controls", Journal of Aircraft, vol. 32, No. 1, Jan.-Feb. 1995, pp. 68-76.

* cited by examiner

*Primary Examiner* — Timothy D Collins
*Assistant Examiner* — Jamie S Stehle

(57) ABSTRACT

The disclosure provides in one embodiment a wing tip device for a wing of an air vehicle. The device comprises a tip tail element, a boom element attaching the tip tail element to a wing tip, a hinge element connecting the tip tail element to the boom element, and an actuator element connected to the hinge element. One or more wing load sensors sense wing loads, and a flight control system controls the actuator element. A load alleviation method and system for an air vehicle are also provided.

32 Claims, 15 Drawing Sheets

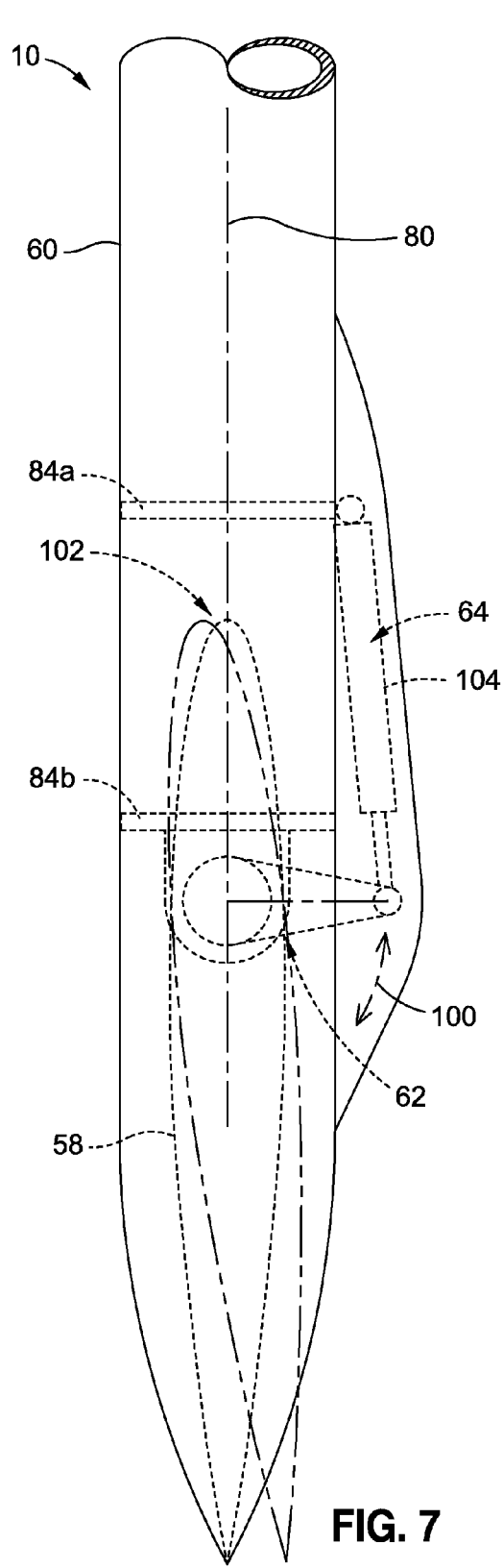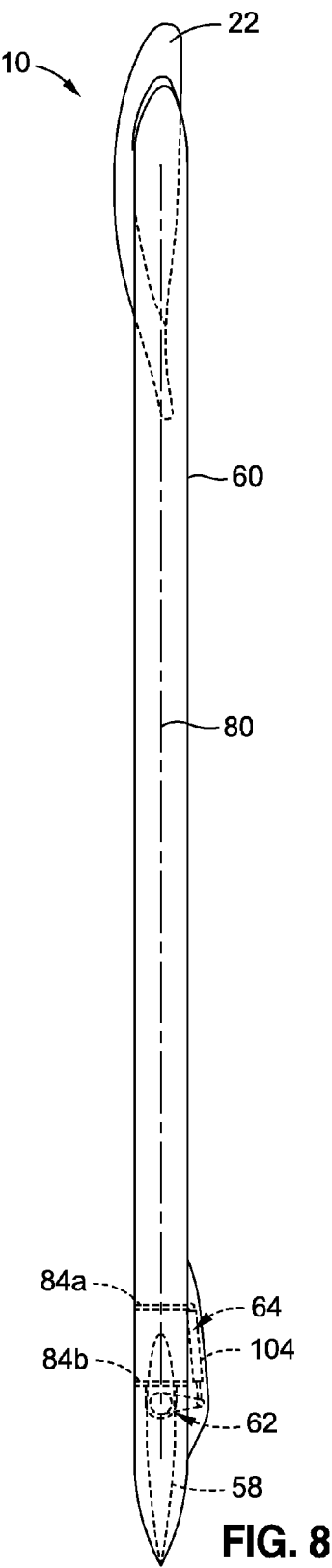

WING TIP LOAD ALLEVIATION DEVICE AND METHOD

BACKGROUND

1) Field of the Disclosure

The disclosure relates generally to air vehicles, and more particularly, to wing tip devices for use on air vehicles.

2) Description of Related Art

Air vehicles, such as unmanned air vehicles, solar powered aircraft, non-solar powered aircraft, high altitude air vehicles, and commercial and military aircraft, can be susceptible to atmospheric turbulence, such as wind gust loads, which can significantly overload the wings. When an air vehicle is subjected to a sudden wind gust, wind gust loads may be created on a wing or wings of the air vehicle. Such wind gust loads can cause sudden variations in the wing angle of attack which can correspondingly cause sudden variations in the wing lift and can result in wing bending that can exceed the wing load.

Devices exist that can be installed in an air vehicle wing to alleviate or reduce wind gust loads and control the wing bending resulting from such wind gust loads. For example, such devices can include wing ailerons and spoilers. Ailerons are hinged control surfaces attached to the trailing edge of a wing. Spoilers are plates on the top surface of a wing which can be extended upward into the airflow and spoil it. However, such ailerons and spoilers can add weight and drag and may not be effective with air vehicles that are sensitive to added weight and drag, such as solar powered aircraft. In addition, certain air vehicles, such as solar powered aircraft, fly at very near stall, and significant wind gust loads may drive the wing into stall. Stalls in air vehicles, in particular, fixed-wing air vehicles, are often experienced when air vehicle wings produce an increased air resistance and a decreased lift as the angle of attack is increased and exceeds the critical angle of attack. A stalled wing can affect aerodynamic lift or efficiency of a wing design. It is thus desirable that a device installed to control wind gust loads be able to operate with the wing when the wing is in a stalled condition. However, ailerons and spoilers have limited effect in controlling wing bending and loading in an aerodynamically stalled environment.

Known wing tip devices, such as winglets, can be installed in the tip of a wing to increase the lift generated at the wing tip and reduce lift induced drag caused by wing tip vortices. However, winglets can add weight and drag and may not be effective with air vehicles that are sensitive to added weight and drag, such as solar powered aircraft. In addition, winglets can add to the wing's bending load, thus requiring a stronger wing which can add weight and limit flight load capability.

Accordingly, there is a need in the art for a wing tip load alleviation device and method for use on an air vehicle that provides advantages over known devices and methods.

SUMMARY

This need for a wing tip load alleviation device and method for use on an air vehicle is satisfied. The wing tip load alleviation device, method, and system disclosed herein provide passive and significant active load alleviation when controlled by an air vehicle control system. The wing tip load alleviation device, method, and system reduce outboard wing aerodynamic loading, and therefore wing bending moments over the entire wing, thereby reducing critical wing stresses and/or weight, improving the overall performance and/or flight safety of the air vehicle. The wing tip load alleviation device, method, and system also reduce drag-due-to-lift of the wing, overcoming any added drag and weight of the wing tip device, thus allowing a neutral performance impact before the load alleviation performance improvement.

In an embodiment of the disclosure, there is provided a wing tip device for a wing of an air vehicle. The device comprises a tip tail element, a boom element attaching the tip tail element to a wing tip, a hinge element connecting the tip tail element to the boom element, and an actuator element connected to the hinge element. One or more wing load sensors sense wing loads, and a flight control system controls the actuator element.

In another embodiment of the disclosure, there is provided an air vehicle. The air vehicle comprises at least one fuselage and at least one wing having at least one wing tip. The air vehicle further comprises a flight control system. The air vehicle further comprises a power system. The air vehicle further comprises one or more wing load sensors connected to the flight control system and connected to the power system and used to sense wing loads and wing bending moments. The air vehicle further comprises a wing tip load alleviation device attached to the at least one wing tip. The device comprises a tip tail element, a boom element attaching the tip tail element to the wing tip, a hinge element connecting the tip tail element to the boom element, and an actuator element connected to the hinge element. The flight control system controls the actuator element.

In another embodiment of the disclosure, there is provided a wing tip device for a wing of an air vehicle. The wing tip device comprises a tip tail element and a boom element attaching the tip tail element to the wing tip. The tip tail element is non-movable and rigidly attached to the boom element, such that the tip tail element trails the wing tip, causing the wing to twist down when the tip tail element is loaded and reducing wing loading in an amount greater than an increased tip tail element load.

In another embodiment of the disclosure, there is provided a load alleviation method for use with a wing of an air vehicle. The method comprises attaching a wing tip device to at least one wing tip of the wing of the air vehicle. The wing tip device comprises a tip tail element, a boom element attaching the tip tail element to the wing tip, a hinge element connecting the tip tail element to the boom element, and an actuator element connected to the hinge element. The method further comprises using a flight control system to control and command the actuator element to actuate the hinge element and rotate the tip tail element about the boom element.

In another embodiment of the disclosure, there is provided a load alleviation system for an air vehicle. The system comprises a power system and a flight control system. The system further comprises a wing tip load alleviation device attached to at least one wing tip of the air vehicle. The wing tip load alleviation device comprises a tip tail element, a boom element attaching the tip tail element to the wing tip, a hinge element connecting the tip tail element to the boom element, and an actuator element connected to the hinge element. One or more wing load sensors sense wing loads, and the flight control system controls the actuator element.

The features, functions, and advantages that have been discussed can be achieved independently in various embodiments of the disclosure or may be combined in yet other embodiments further details of which can be seen with reference to the following description and drawings.

BRIEF DESCRIPTION OF THE DRAWINGS

The disclosure can be better understood with reference to the following detailed description taken in conjunction with the accompanying drawings which illustrate preferred and exemplary embodiments, but which are not necessarily drawn to scale, wherein:

FIG. 7 is an illustration of an enlarged partial side view of an embodiment of a right side wing tip device of the disclosure;

FIG. 8 is an illustration of an enlarged side view of an embodiment of a right side wing tip device of the disclosure;

DETAILED DESCRIPTION

Disclosed embodiments will now be described more fully hereinafter with reference to the accompanying drawings, in which some, but not all of the disclosed embodiments are shown. Indeed, several different embodiments may be provided and should not be construed as limited to the embodiments set forth herein. Rather, these embodiments are provided so that this disclosure will be thorough and complete and will fully convey the scope of the disclosure to those skilled in the art.

Figure 1:
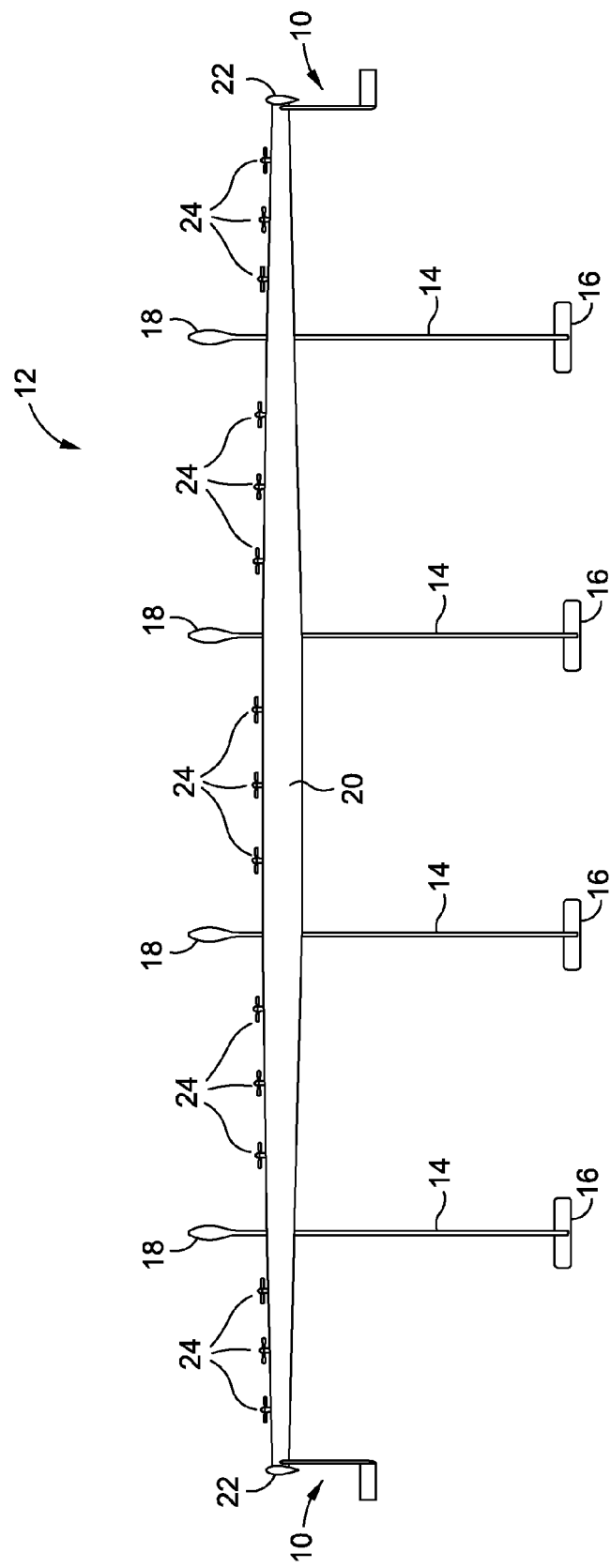
FIG. 1 is an illustration of a top view of an exemplary air vehicle having an embodiment of a wing tip device of the disclosure.

Now referring to the Figures, FIG. 1 shows an embodiment of a wing tip device 10 of the disclosure in use with an exemplary embodiment of an air vehicle 12. FIG. 1 is an illustration of a top view of the air vehicle 12 having the wing tip device 10. The air vehicle 12 is a multiple fuselage air vehicle having four (4) fuselages 14, four (4) tails 16, four (4) noses 18, a wing 20, two (2) wing tips 22, and fifteen (15) propulsion elements 24, such as, for example, in the form of motor propellers or another suitable propulsion element. One wing tip device 10 is attached to each wing tip 22.

Figure 5:
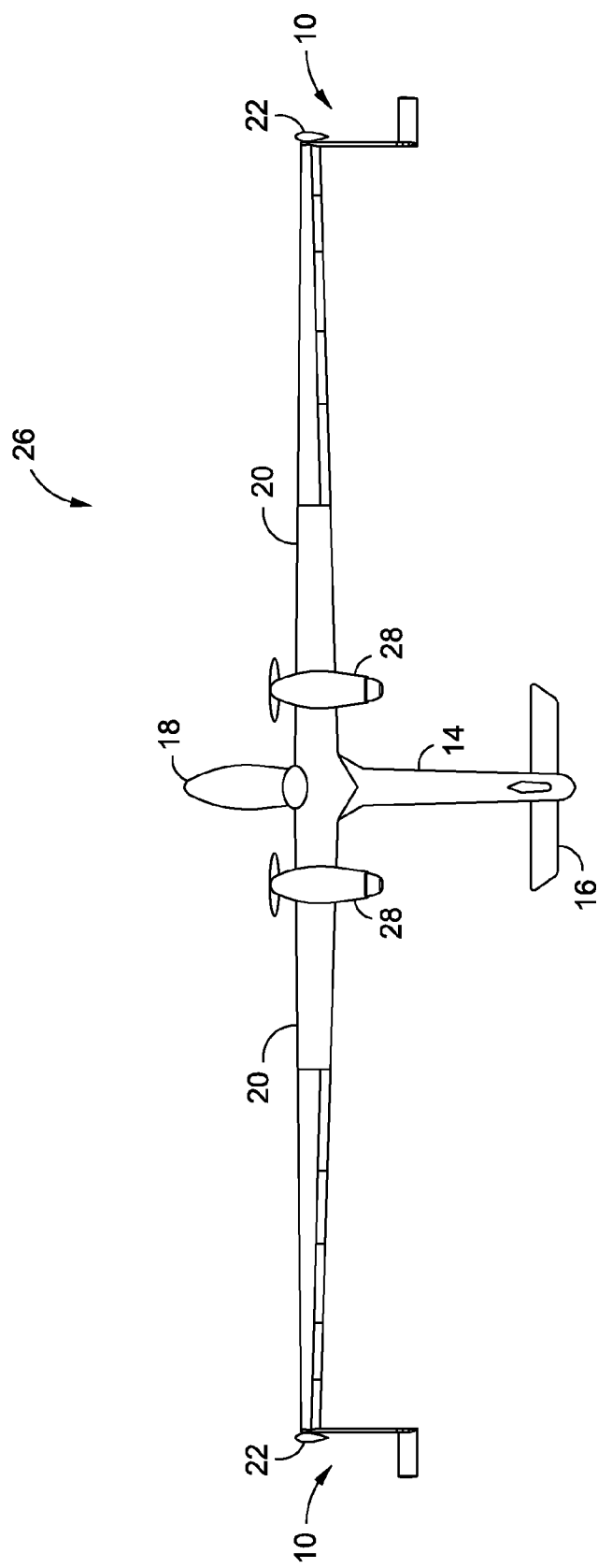
FIG. 5 is an illustration of a top view of another exemplary air vehicle having an embodiment of a wing tip device of the disclosure.

Although FIG. 1 shows the air vehicle 12 having multiple fuselages 14, the wing tip device 10 may also be used with an air vehicle 26 having a single fuselage 14 as shown in FIG. 5. FIG. 5 is an illustration of a top view of exemplary air vehicle 26 having an embodiment of the wing tip device 10 of the disclosure. The air vehicle 26 has fuselage 14, tail 16, nose 18, wings 20, wing tips 22, and engines 28.

The wing tip device 10 may also be used with other suitable air vehicles. For example, the wing tip device 10 may be used with unmanned air vehicles, manned air vehicles, solar powered aircraft, non-solar powered aircraft, high altitude air vehicles such as air vehicles capable of flying higher than 60,000 feet, commercial and military aircraft, long duration flight air vehicles such as air vehicles capable of flying continuously for five or more years, and other suitable air vehicles. Preferably, the air vehicle is a large air vehicle with one or more flexible wings and preferably has a high wing aspect ratio, for example, greater than 25. However, the wing load alleviation device and system of the disclosure may also benefit lower wing aspect ratio air vehicles.

As shown in FIGS. 1 and 5, the wing tip device 10 is preferably attached to each wing tip 22 of the wing 20 of the respective air vehicles 12, 26 to reduce wing loads and wing bending moments on the wings 20 of the respective air vehicles 12, 26. The wing loads may comprise vertical loads or forces applied to the wing, torsional or twisting loads, and other suitable wing loads. The wing bending moments comprise the integration of the vertical forces along the wing span and may comprise critical structural loads used in designing the wing structure.

Figure 2:
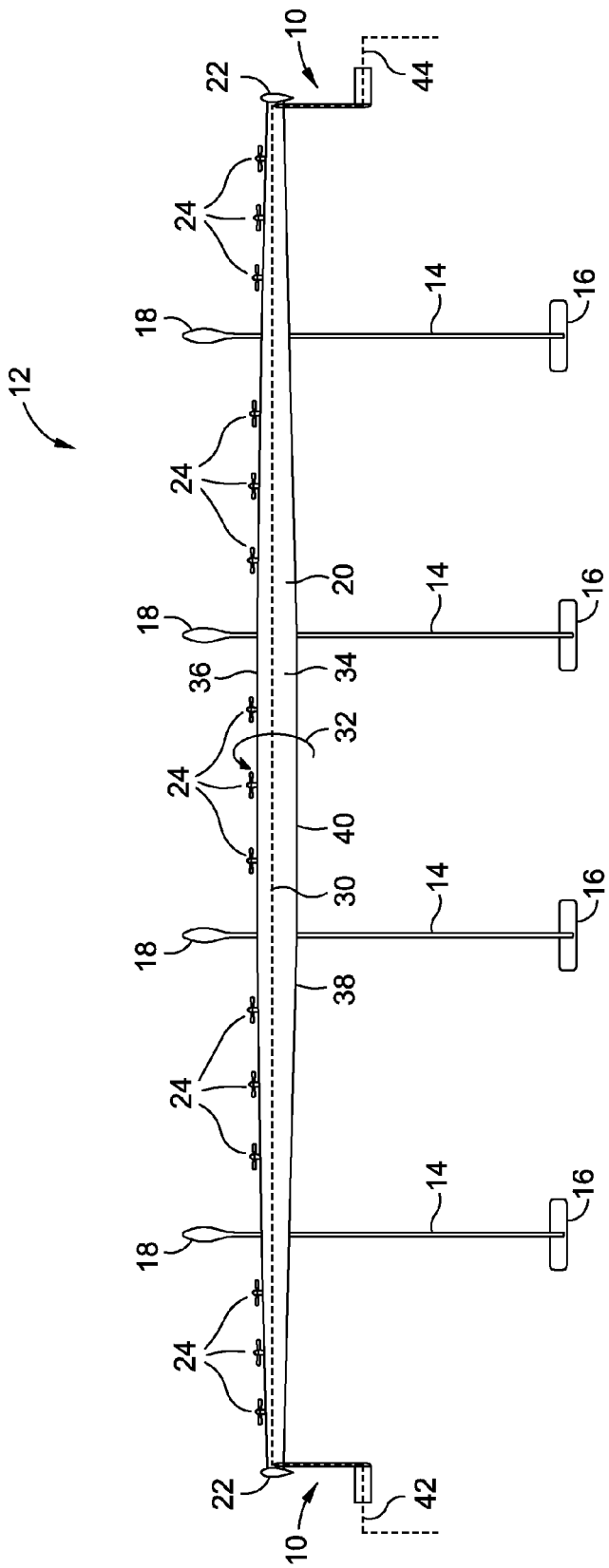
FIG. 2 is an illustration of a top view of the air vehicle and wing tip device of FIG. 1 showing the vortex pattern of the wing.

FIG. 2 is an illustration of a top view of the air vehicle 12 and wing tip device 10 of FIG. 1 showing a vortex pattern 30 (indicated by the dotted line) horizontally across the wing 20 and vertically down each wing tip device 10. A wing vortex (helical path) direction 32 indicates air flow moving up over a top 34 of the wing 20 and over a leading edge 36 of the wing 20, and under a bottom 38 (see also FIG. 4) of the wing 20 and around a trailing edge 40 of the wing 20, and back to the leading edge 36 of the wing. A left wing tip device trailing vortex 42 indicates air flow moving in a direction aft of the wing 20 but in the same elevation plane as the wing 20. A right wing tip device trailing vortex 44 indicates air flow moving in a direction aft of the wing 20 but in the same elevation plane as the wing 20.

Figure 3:
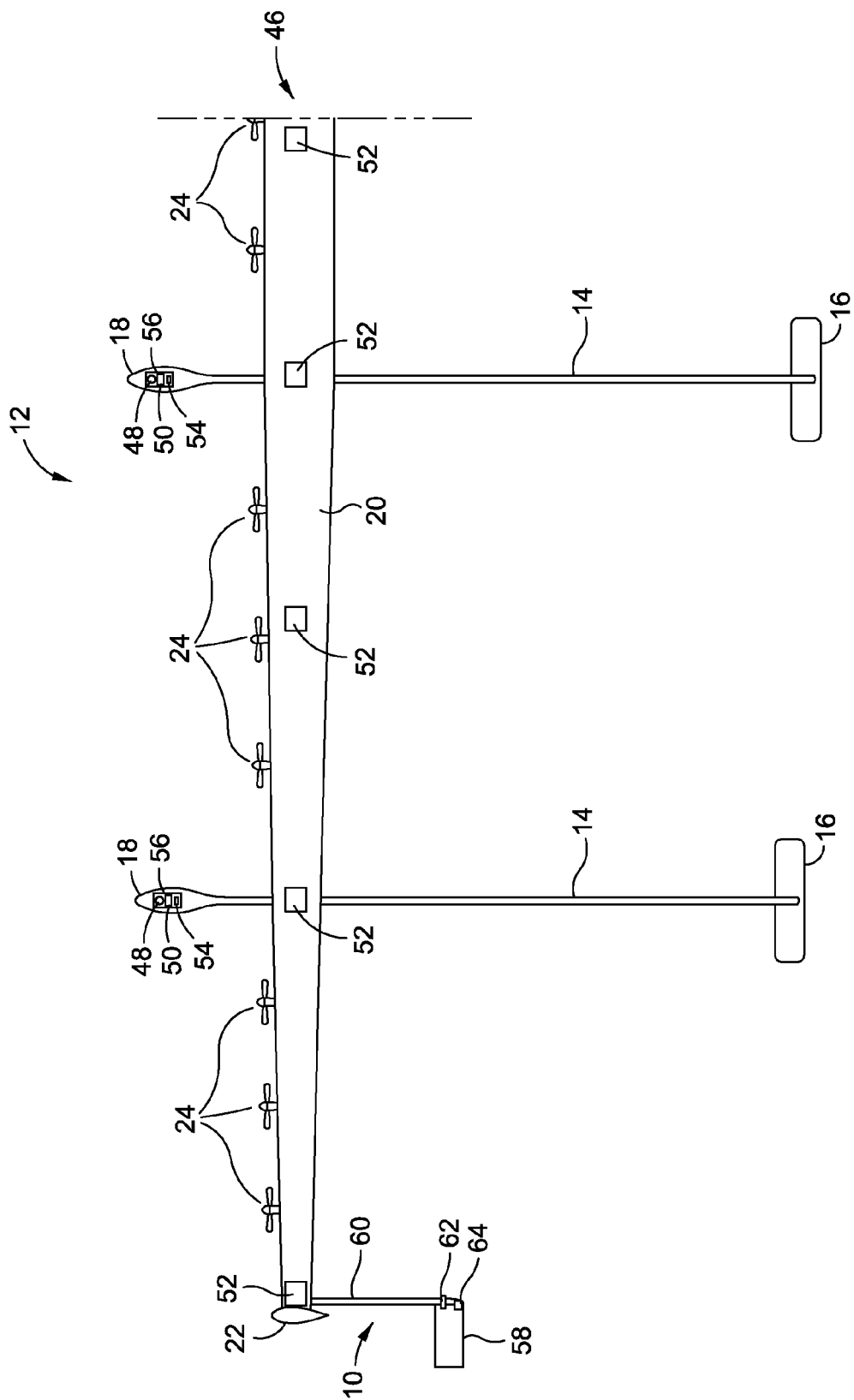
FIG. 3 is an illustration of a top view of the left half of the air vehicle and wing tip device of FIG. 1 showing locations of a flight control system, a power system, wing load sensors, and flight sensors.

FIG. 3 is an illustration of a top view of a left half 46 of the air vehicle 12 and wing tip device 10 of FIG. 1 showing locations of a flight control system 48, a power system 50, wing load sensors 52, and flight sensors 54. The air vehicle 12 preferably has flight control system 48, power system 50, one or more wing load sensors 52 connected to the flight control system 48 and connected to the power system 50, and one or more flight sensors 54 connected to the flight control system 48 and connected to the power system 50. However, air vehicles having one or more embodiments of the wing tip device of the disclosure may have fewer of these system and sensor components or additional system and sensor components.

As shown in FIG. 3, the flight control system 48, the power system 50, and the one or more flight sensors 54 may preferably be housed in a bay 56 in each of the noses 18 of the air vehicle 12. However, the flight control system 48, the power system 50, and the one or more flight sensors 54 may also be housed in another suitable location in the air vehicle 12. The flight control system 48 may comprise one or more computers (not shown) network connected to the wing tip device 10 and the wing load sensors 52. The wing load sensors 52 sense wing loads and wing bending moments on the wing 20 for use in the flight control system 48 to determine a magnitude at which the wing 20 is being loaded and to determine wing tip deflection commands. The one or more computers may be housed in one or more bays 56 located in one or more noses 18 of the air vehicle 12. However, the one or more computers may also be housed in another suitable location in the air vehicle 12. The computers may have specifically developed control algorithms that use the wing load sensors 52 to determine the magnitude at which the wing 20 is being loaded. The power system 50 may be electrical, solar, battery operated, fuel burning motors, fuel cells, solar cells, or another suitable power source, and is preferably connected to and provides power to the wing tip device 10 and the wing load sensors 52. The power system 50 is preferably a power distribution network that distributes power throughout the air vehicle 12.

As shown in FIG. 3, the wing tip device 10 comprises a tip tail element 58 extending outboard and aft of the wing tip 22 of the wing 20 of the air vehicle 12. The wing tip device 10 further comprises a boom element 60, a hinge element 62, and an actuator element 64, which will all be discussed in further detail below. The flight control system 48 controls and may command the actuator element 64 to actuate the hinge element 62 and rotate the tip tail element 58 about the boom element 60, resulting in a reduction in the wing loads and wing bending moments on the wing 20. The wing load sensors 52 are preferably connected to the flight control system 48 to transmit sensor and command data and are preferably connected to the power system 50 for power.

Figure 4:
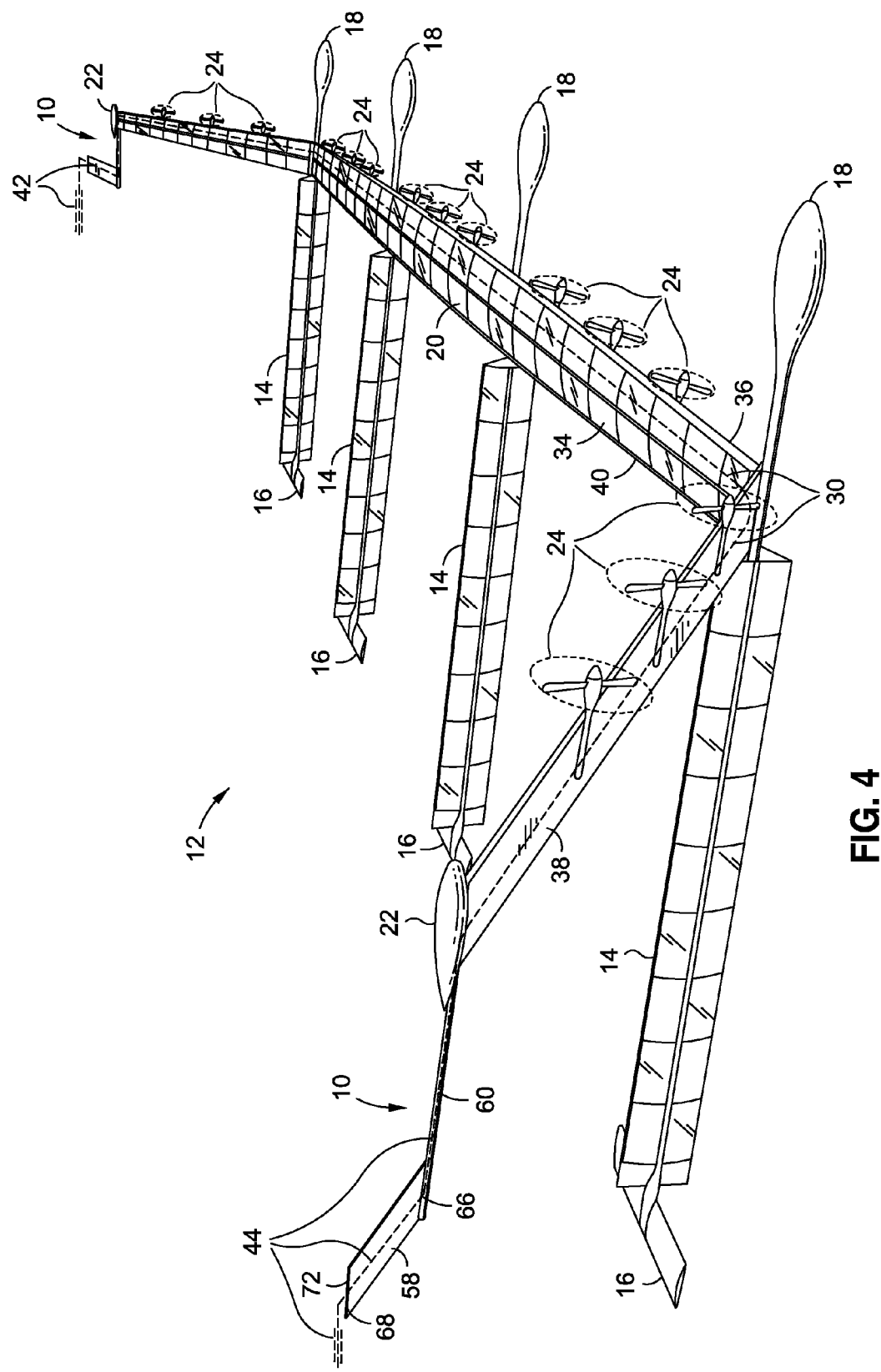
FIG. 4 is an illustration of a right side perspective view of the air vehicle of FIG. 1 having an embodiment of a wing tip device of the disclosure.

FIG. 4 is an illustration of a right side perspective view of the air vehicle 12 of FIG. 1 having an embodiment of the wing tip device 10 of the disclosure. FIG. 4 shows the air vehicle 12 having the wing tip device 10 on each wing tip 22, the fuselages 14, the tails 16, the noses 18, the wing 20, the propulsion elements 24, the top 34 of the wing 20, the leading edge 36 of the wing 20, the bottom 38 of the wing 20, and the trailing edge 40 of the wing 20. As shown in FIG. 4, the tip tail element 58 is preferably positioned so that an inboard end 66 of the tip tail element 58 lies within an elevation plane 68 of the right wing tip device trailing vortex 44, resulting in a reduced net drag-due-to-lift of a combined load of the wing 20 and the wing tip device 10. The right wing tip device trailing vortex 44 starts at the wing tip 22, extends aft a distance down the boom element 60, down the tip tail element 58, and past an outboard end 72 of the tip tail element 58. The right wing tip device trailing vortex 44 is in the same elevation plane 68 as the wing tip 22. The left wing tip device trailing vortex 42 starts at the wing tip 22 and extends aft. The vortex pattern 30 across the wing 20 is also shown. The lift of the tip tail element 58 may be controlled by its relative angle of attack (fixed attachment or actuated angle). The lift of the tip tail element 58 produces a torque about the wing tip 22 due to its location aft of the wing 20. This torque twists the wing tip 22 and thus reduces the overall or net load of the combined wing tip 22 and tip tail element 58, resulting in a reduction of the entire wing's 20 bending moments. Moving the tip tail element 58 further aft (resulting in a longer boom element 60) can increase the torque applied to the wing 20, resulting in a larger passive load alleviation effect.

In one embodiment of the disclosure there is provided air vehicle 12 having wing tip device 10 for load alleviation. As shown in FIGS. 1-4, air vehicle 12 comprises at least one fuselage 14 and at least one wing 20 having at least one wing tip 22. Preferably, the air vehicle 12 has a flexible wing with a high wing aspect ratio of greater than 25. The air vehicle 12 further comprises flight control system 48 (see FIG. 3), preferably with computers (not shown) that have or use one or more control algorithms 232 (see FIG. 15). The air vehicle 12 further comprises power system 50 (see FIG. 3) for providing power to the air vehicle 12. The air vehicle 12 further comprises one or more wing load sensors 52 (see FIG. 3) connected to the flight control system 48 and connected to the power system 50 and used to sense wing loads and wing bending moments. The control algorithms use the one or more wing load sensors 52 to determine a magnitude at which the wing 20 is being loaded. The air vehicle 12 further comprises wing tip device 10 for load alleviation (see FIG. 3) attached to the at least one wing tip 22. The wing tip device 10 for load alleviation comprises tip tail element 58 (see FIG. 3) extending outboard and aft of the wing tip 22. The wing tip device 10 for load alleviation further comprises boom element 60 (see FIG. 3) attaching the tip tail element 58 to the wing tip 22. The wing tip device 10 for load alleviation further comprises hinge element 62 (see FIG. 3) connecting a portion of the tip tail element 58 to a portion of the boom element 60 and allowing rotation of the tip tail element 58 about the boom element 60. The wing tip device 10 for load alleviation further comprises actuator element 64 (see FIG. 3) connected to the hinge element 62 and controlled and commanded by the flight control system 48 to actuate the hinge element 62 and rotate the tip tail element 58 about the boom element 60, resulting in alleviation of the wing loads and wing bending moments on the wing 20. During flight the wing tip device 10 for load alleviation flies at a lower lift coefficient than the wing 20 (this is obtained by rotation of the tip tail element 58 with the actuator element 64 to reduce its angle of attack in a non-stalled state), resulting in an increased stall margin when a wind gust load increases a wing angle of attack. The wing tip device 10 for load alleviation, when controlled by the flight control system 48, provides at least approximately 50% active load alleviation or active reduction in wing loads and wing bending moments and at least approximately 15% passive load alleviation or passive reduction in wing loads and wing bending moments on the wing.

Figure 6:
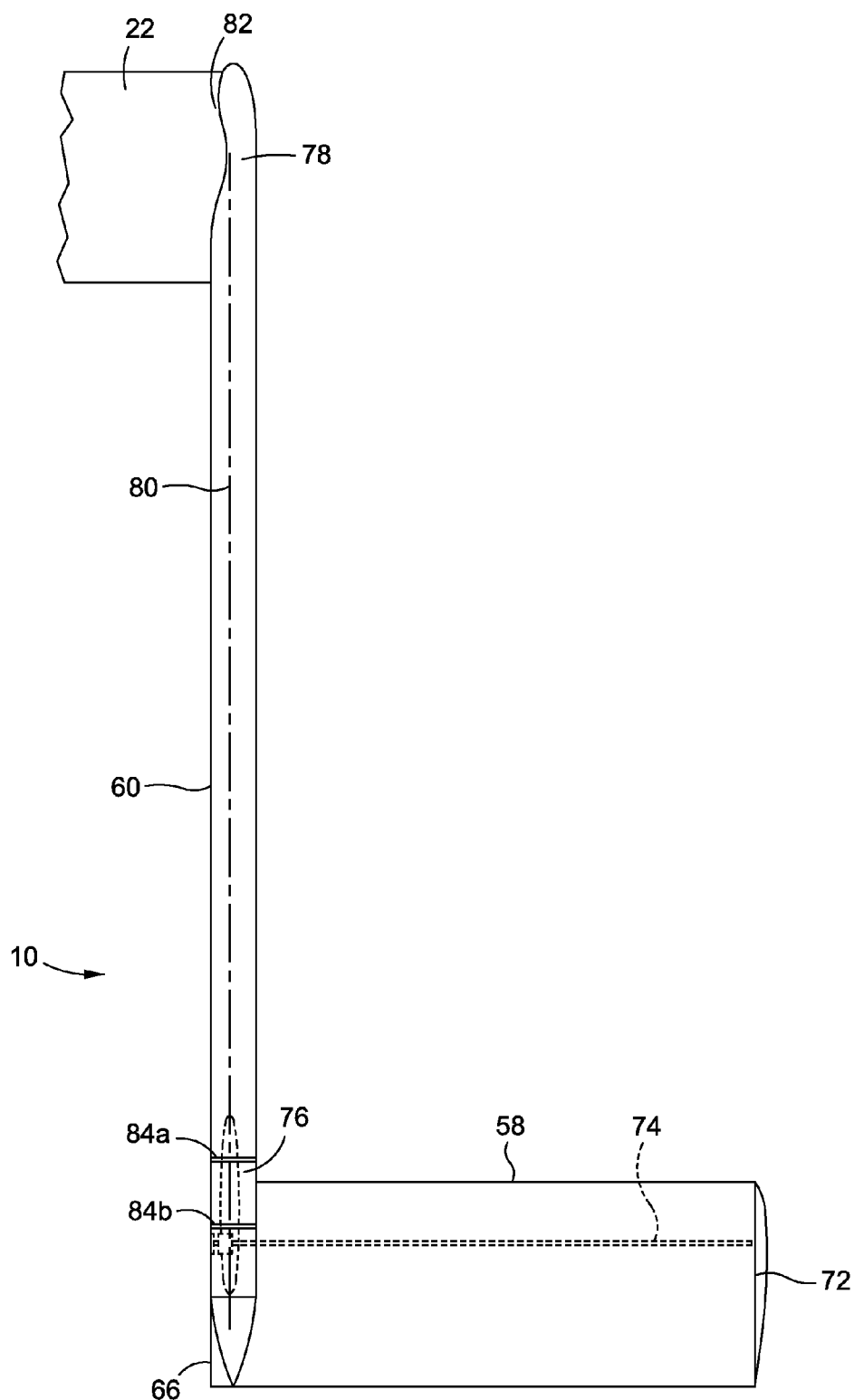
FIG. 6 is an illustration of an enlarged top view of an embodiment of a right side wing tip device of the disclosure.
Figure 9:
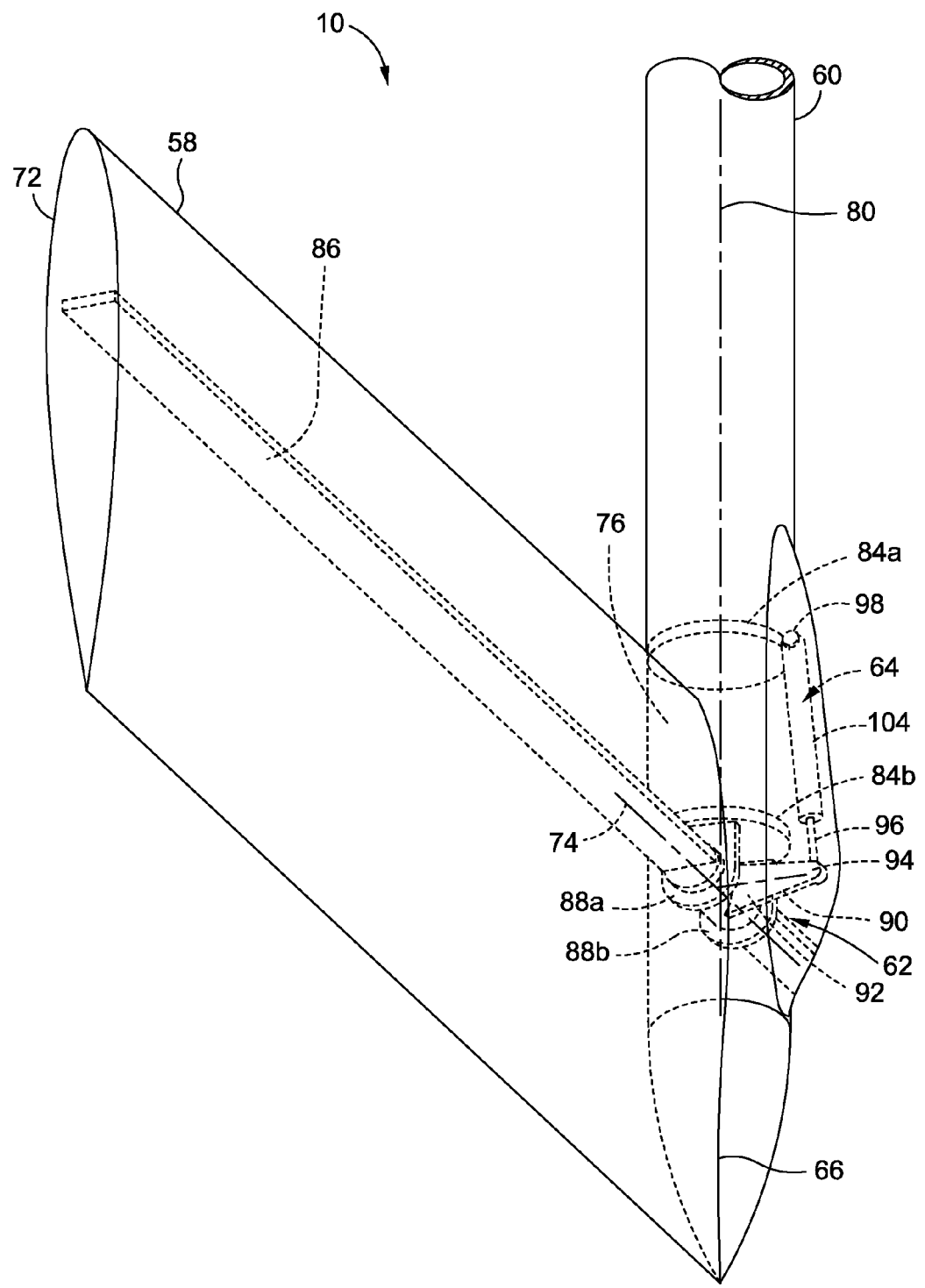
FIG. 9 is an illustration of an enlarged bottom perspective view of an embodiment of a right side wing tip device of the disclosure with a linear actuator.

FIG. 6 is an illustration of an enlarged top view of an embodiment of a right side wing tip device 10 of the disclosure. FIG. 7 is an illustration of an enlarged partial side view of an embodiment of the right side wing tip device 10 of the disclosure. FIG. 8 is an illustration of an enlarged side view of an embodiment of the right side wing tip device 10 of the disclosure. FIG. 9 is an illustration of an enlarged bottom perspective view of an embodiment of the right side wing tip device 10 of the disclosure with a linear actuator 104. As shown in FIG. 6, the wing tip device 10 comprises tip tail element 58 having inboard end 66 and outboard end 72. The tip tail element 58 further comprises a pivot axis 74. Preferably, the tip tail element 58 is movable and rotatable (see FIGS. 7-9). Alternatively, the tip tail element 58 may be rigidly attached to the boom element 60 (see FIG. 12), as discussed in further detail below. As shown in FIG. 6, the wing tip device 10 further comprises boom element 60 attaching the tip tail element 58 to the wing tip 22. The boom element 60 has a first end 76, a second end 78, and a central axis 80. The first end 76 of the boom element 60 is preferably attached to the inboard end 66 of the tip tail element 58. The second end 78 of the boom element 60 is preferably attached to a portion 82 of the wing tip 22. The boom element 60 may further comprise one or more bulkheads 84a, 84b within the boom element 60. The bulkheads 84a, 84b transfer the tip tail element 58 load, the boom element 60 load, and the actuator element 64 load onto the boom element 60 structure. As shown in FIG. 9, a spar 86 extends within the tip tail element 58 and through the boom element 60. The spar 86 strengthens the tip tail element 58 and carries the major loads for the tip tail element 58.

As further shown in FIGS. 7-9, the wing tip device 10 comprises in one embodiment the hinge element 62. Preferably, the hinge element 62 is a structural hinge element. As shown in FIG. 9, the hinge element 62 connects a portion of inboard end 66 of the tip tail element 58 to a portion of first end 76 of the boom element 60 and allows rotation of the tip tail element 58 about the boom element 60. The hinge element 62 comprises one or more bearing elements 88a, 88b and a pivot element 90. The hinge element 62 preferably has two bearing elements 88a, 88b that are preferably located within the boom element 60 and attached to the spar 86 that extends through the boom element 60. However, the hinge element 62 may have more than two bearing elements. The bearing elements 88a, 88b transfer loads from the tip tail element 58 to the boom element 60. The first end 76 or aft end of the boom element 60 is preferably attached to the bearing elements 88a, 88b and moves with the tip tail element 58. The pivot element 90 is preferably positioned between the bearing elements 88a, 88b. The pivot element 90 has a first end 92 preferably attached to the spar 86 that extends through the boom element 60. The pivot element 90 has a second end 94 that is preferably attached to the actuator element 64. The pivot element 90 may have a bell crank design or another suitable design. A bell crank is a type of crank that changes motion through an angle and is used to convert the direction of reciprocating movement. The angle of motion may preferably be an angle from 0 degrees to +/−45 degrees for one embodiment of the actuator element 64 in the form of a linear actuator 104 (see FIG. 9). The angle may preferably be an angle from 0 degrees to +/−60 degrees for another embodiment of the actuator element in the form of a rotary actuator 126 (see FIG. 11).

As further shown in FIGS. 7-9, the wing tip device 10 comprises actuator element 64 connected to the hinge element 62. As shown in FIG. 9, the actuator element 64 has a first end 96 attached to the second end 94 of the pivot element 90, and the actuator element 64 has a second end 98 attached to bulkhead 84a of the boom element 60. The actuator element 64 is preferably attached to the boom element 60 in front of the pivot element 90 or bell crank, and is attached to the pivot element 90 or bell crank as well. The actuator element 64 is controlled by the flight control system 48 and is powered by the power system 50. The actuator element 64 actuates the hinge element 62 to rotate the tip tail element 58 about the boom element 60 in direction 100 (see FIG. 7). In particular, the actuator element 64 actuates the hinge element 62 to rotate the tip tail element 58 around the pivot axis of the spar 86 and bearing elements 88a, 88b. The loading of the tip tail element 58 can be actively controlled by the actuator element 64 to rotate the tip tail element 58, and the actuator element 64 actively controls an angle of attack 102 (see FIG. 7) or angle of rotation of the tip tail element 58 relative to existing or local air flow conditions. Actively controlling the angle of attack 102 of the tip tail element 58 with the actuator element 64 can add significantly increased load alleviation. The tip tail element 58 can be actively controlled to fly the wing tip 22 back to its desired position. This active control function can provide large margin to the bending divergence of the air vehicle. The tip tail element 58 actuation can be coupled with the wing load sensors 52 and the flight control system 48 of the air vehicle 12 to automatically control wing bending divergence resulting from large atmospheric gusts or wind gust loads. The actuator element 64 is preferably controlled by the flight control system 48, which has or uses specifically developed control algorithms that use the wing load sensors 52 to determine a magnitude at which the wing 20 is being loaded. The flight control system 48 then commands the actuator element 64 to rotate the tip tail element 58 to reduce the wing loads and wing bending moments on the wing 20.

In one embodiment of the wing tip device 10, the tip tail element 58 is movable and the actuator element 64 may comprise a linear actuator 104 (see FIGS. 7 and 9) that rotates about the hinge element 62. The combination of the linear actuator 104 and pivot element 90 or bell crank is preferable with wing tip devices of the disclosure having a single spar 86 design (see FIG. 9). In addition, the movable and rotatable tip tail element 58 is preferred in situations where the wing 20 may be in a stall condition caused by large wind gust loads. Preferably, one or more embodiments of the wing tip device 10 of the disclosure can be implemented to operate on a stalled wing.

Figure 11:
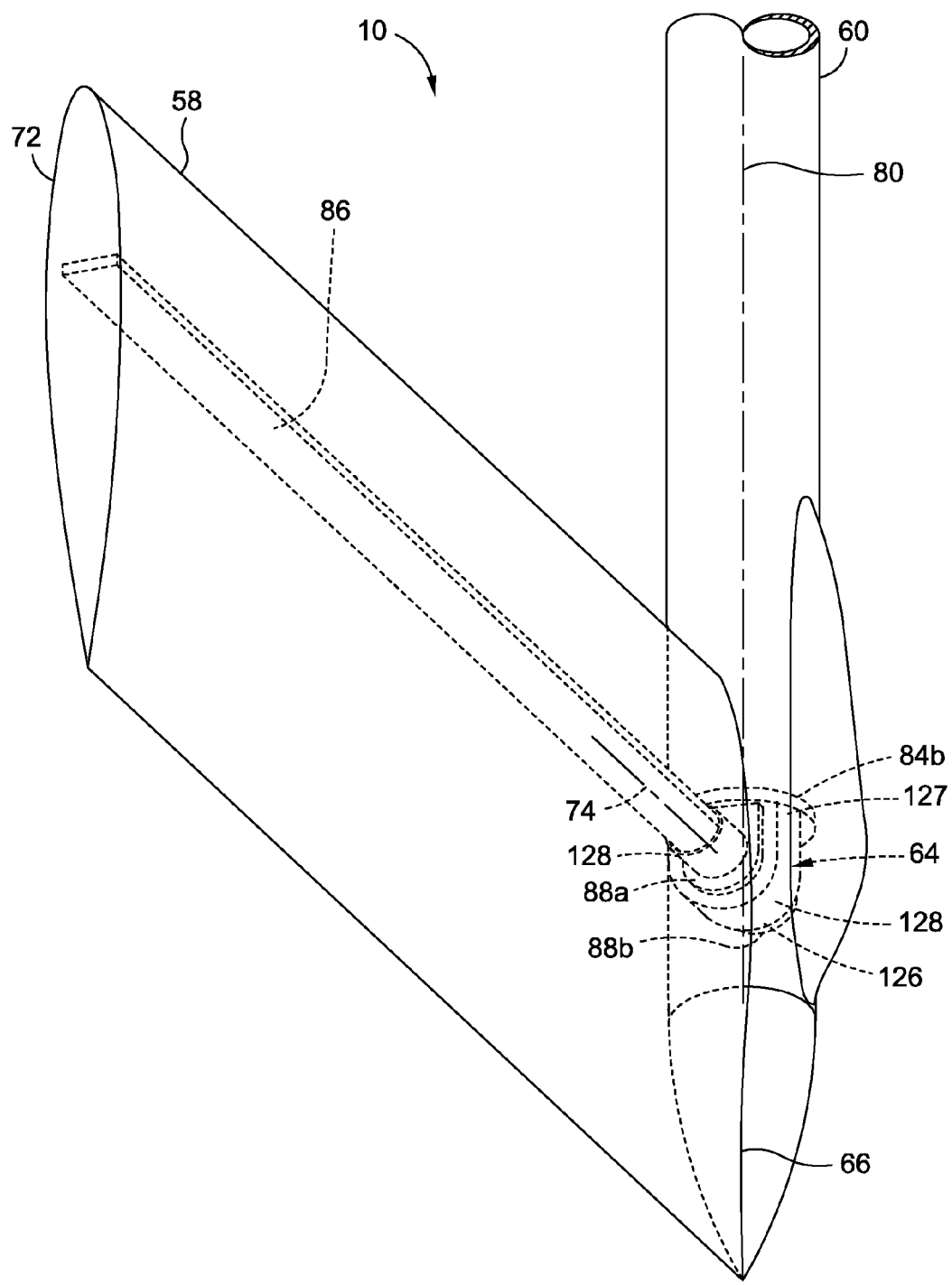
FIG. 11 is an illustration of an enlarged bottom perspective view of another embodiment of a right side wing tip device of the disclosure with a rotary actuator.

In another embodiment of a wing tip device 10, as shown in FIG. 11, the tip tail element 58 is movable and a rotary actuator 126 is used instead of a linear actuator 104. FIG. 11 is an illustration of an enlarged bottom perspective view of another embodiment of the right side wing tip device 10 of the disclosure where the actuator element 64 comprises rotary actuator 126. The rotary actuator 126 has an outer portion 127 that is attached to the bulkhead 84b, or alternatively, to the interior of the boom element 60. The rotary actuator 126 has an inner portion 128 that rotates with a rotary motor or gearbox (not shown) and is attached to the spar 86. The rotary actuator 126 may be positioned between the bearing elements 88a, 88b comprising the hinge element 62 to rotate the tip tail element 58. The actuator element of the wing tip device may further comprise other suitable known actuator elements.

Figure 10:
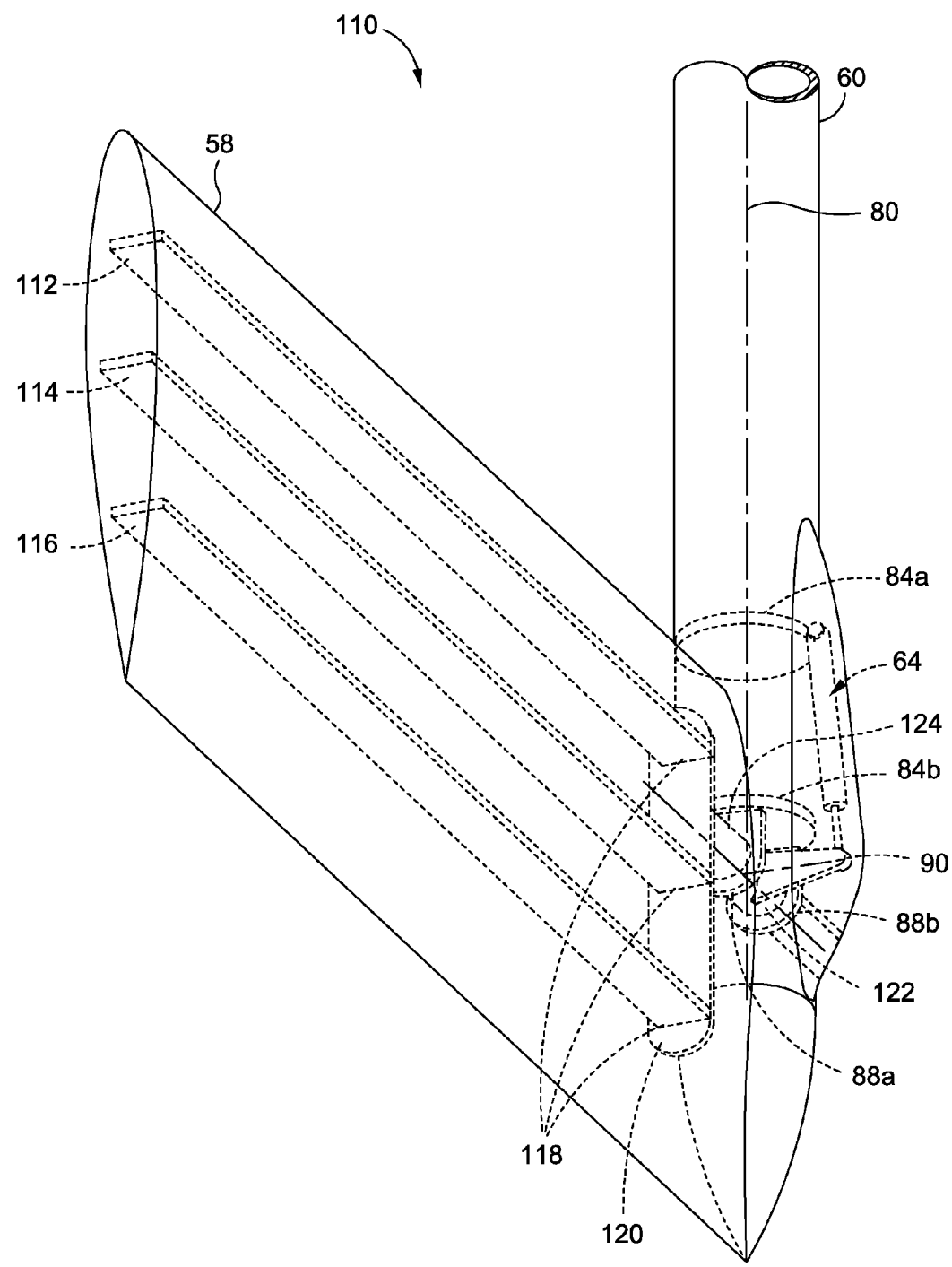
FIG. 10 is an illustration of an enlarged bottom perspective view of another embodiment of a right side wing tip device of the disclosure with a multiple spar design.

In one embodiment, as shown in FIG. 9, the wing tip device 10 may have a single spar 86 design. In another embodiment, as shown in FIG. 10, a wing tip device 110 may have a multiple spar design. FIG. 10 is an illustration of an enlarged bottom perspective view of another embodiment of a right side wing tip device 110 of the disclosure with a multiple spar design. The wing tip device 110 may have a front spar 112, a middle spar 114, and a rear spar 116, all attached at respective inboard ends 118 to a root rib 120. The front spar 112, the middle spar 114, and the rear spar 116 extend within the tip tail element 58 and attach to the root rib 120 on the tip tail element 58 side of the root rib 120. A stub shaft 122 extends through the boom element 60 and an end 124 of the stub shaft 122 may be attached to the root rib 120 on the boom element 60 side of the root rib 120. The stub shaft 122 passes between the bearing elements 88a, 88b and the pivot element 90 or bell crank. The multiple spar design may include actuator element 64 and bulkheads 84a, 84b.

Figure 12:
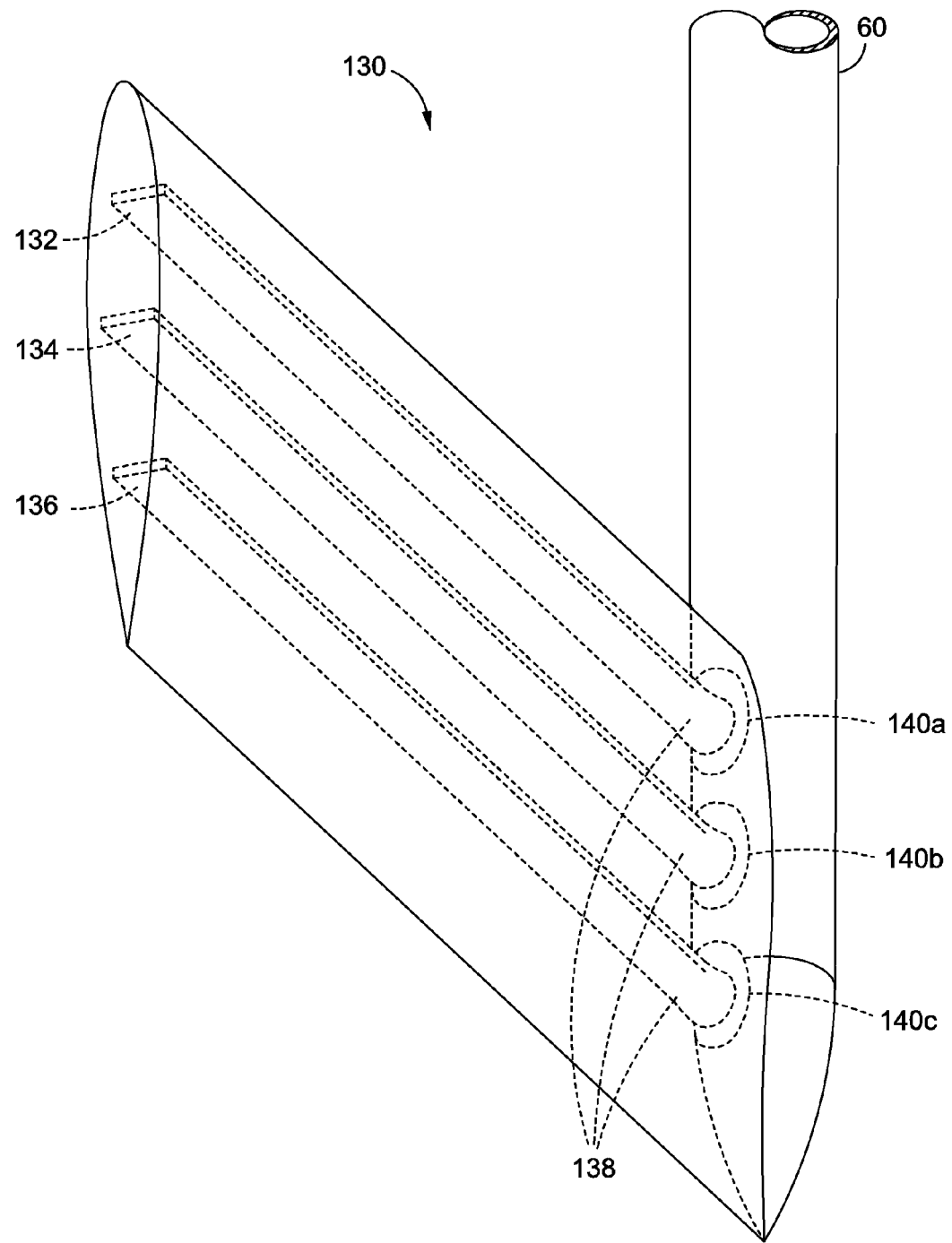
FIG. 12 is an illustration of an enlarged bottom perspective view of another embodiment of a right side wing tip device of the disclosure with a rigidly attached tip tail element.

FIG. 12 is an illustration of another embodiment of a wing tip device 130 having a passive load alleviation design for passive reduction of wing loads and wing bending moments on a wing of an air vehicle, where the air vehicle preferably has a flight control system and a power system. The wing tip device 130 may be preferably attached to the wing tip 22 of the wing 20 in the same or similar location as the wing tip device 10 in FIG. 1. In this embodiment, the tip tail element 58 similarly extends outboard and aft of the wing tip of the air vehicle. However, in this embodiment, the tip tail element 58 is rigidly attached to the boom element 60 and is non-movable. The boom element 60 attaches the rigidly attached tip tail element 58 to the wing tip 22. The wing tip device 130 has no hinge element and no actuator element. The tip tail element 58 may have multiple spars including a front spar 132, middle spar 134, and a rear spar 136, all attached at respective inboard ends 138 to respective bulkheads 140a, 140b, and 140c. Even without the use of active control with the actuated wing tip device 10 discussed above, there can still be passive load alleviation. This is a result of the tip tail element 58 trailing the wing tip 22 (attached to the boom element 60 aft of the wing tip 22), causing the wing to twist nose-down when the tip tail element 58 is loaded, and unloading or reducing wing loading at an amount greater than an increased tip tail element load, resulting in a passive reduction (no active control) in the wing loads and wing bending moments on the wing and thus resulting in a passive load alleviation wing tip device.

If the wing 20 is torsionally stiffer and the torque of the tip tail element 58 does not result in a reduced wing tip load, embodiments of the wing tip device disclosed herein can still work in the actively controlled mode. In addition, embodiments of the wing tip device disclosed herein work in an aeroelastically reversed mode such that when an increase in wing tip lift produces a torque about the wing tip 22, there is a net reduction of a combined load of the wing 20 and wing tip device 10, and the wing loads and wing bending moments on the wing are reduced. Embodiments of the wing tip device disclosed herein may still operate in a conventional mode, that is, not in aeroelastically reversed wing loading and producing passing load increase instead of passing load reduction, if actively controlled by the air vehicle flight control system 48. Embodiments of the wing tip device disclosed herein reduce a lift on the wing tip 22 and reduce loads on the wing tip 22, resulting in a reduction in wing loads and wing bending moments on the wing 20. Moreover, embodiments of the wing tip device disclosed herein add to the wing span of the air vehicle, which in turn, reduces drag.

Figure 13:
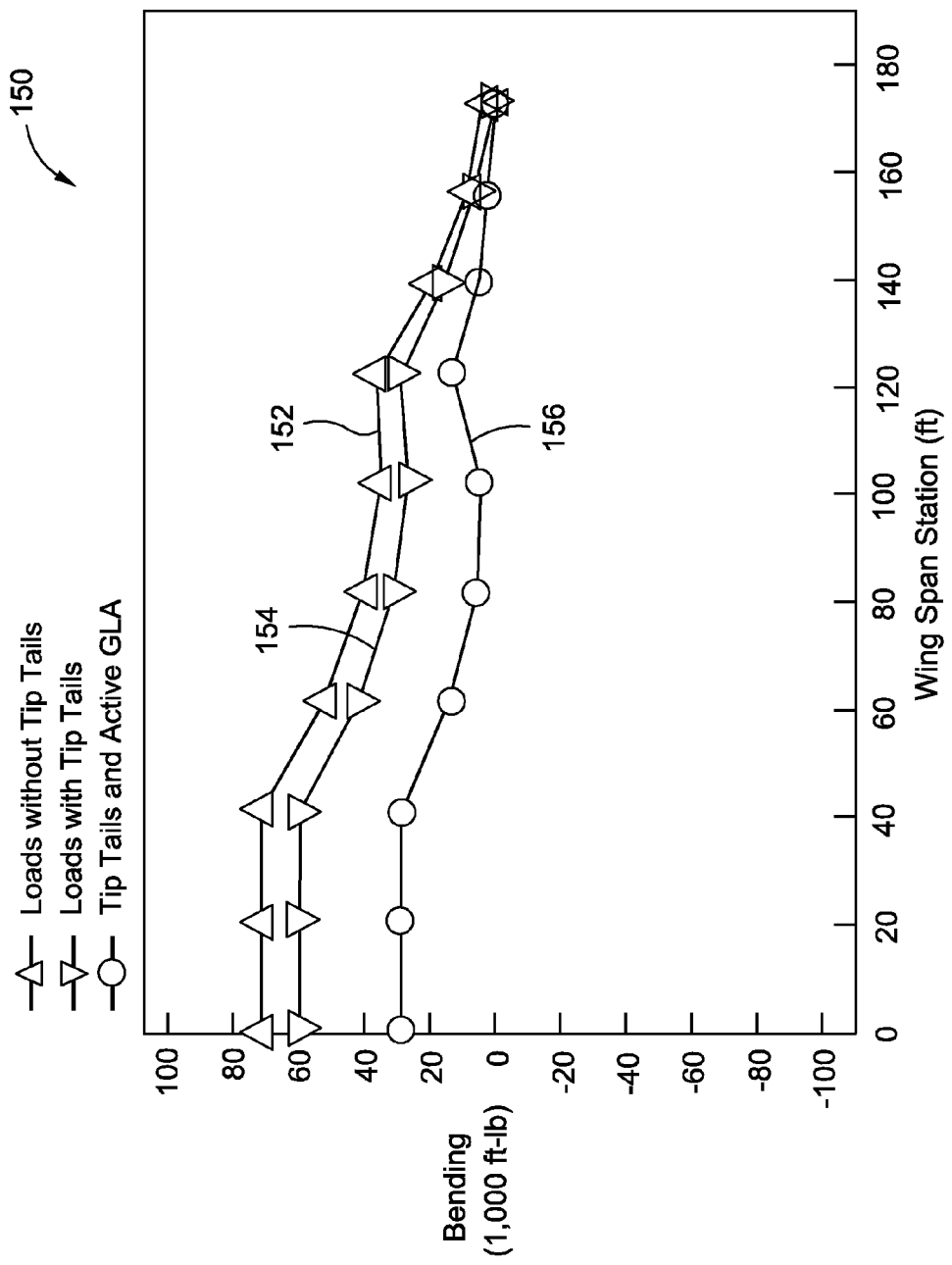
FIG. 13 is an illustration of a graph showing results of analytical simulation tests conducted on wings with and without an embodiment of the wing tip device of the disclosure.

FIG. 13 is an illustration of a graph 150 showing results of analytical simulation tests conducted on wings with and without an embodiment of the wing tip device disclosed herein, and showing wing critical bending moments at bending of 1000 ft-lb (foot-pound) versus wing span station ft (feet). The use of embodiments of the wing tip device disclosed herein were simulated using the RCAS (Rotorcraft Comprehensive Analysis System) nonlinear aeroelastic flight simulation tool, where the air vehicle was flown through a gust designed to maximize wing loading and bending. RCAS is a computational analysis system for modeling rotorcraft and air vehicles. RCAS can model a complete range of rotorcraft and air vehicle configurations in hover, forward-flight, and maneuvering flight conditions. RCAS can perform a variety of engineering calculations, including vehicle performance, aerodynamics and rotor loads, vehicle vibration, flight-control analysis, aeroelastic stability, flight dynamics, and flight simulation. Analysis features in RCAS include trim, maneuver, and stability. The structural modeling by RCAS provides the capability for accurate dynamic simulation that includes the interaction between all system components. RCAS simulations were coupled with developed control algorithms to validate the capability of the wing tip devices of the disclosure.

The results of the simulation showed significant load reduction of the air vehicle with the wing tip device of the disclosure relative to the air vehicle without the wing tip device of the disclosure. FIG. 13 shows a first plot line 152 for RCAS loads on a wing without one of the embodiments of the wing tip device disclosed herein. FIG. 13 shows a second plot line 154 for RCAS loads on a wing with the wing tip device having the passive load alleviation design (see FIG. 12) disclosed herein. FIG. 13 shows a third plot line 156 for RCAS loads on a wing with the wing tip device having the active load alleviation design (see FIG. 9) disclosed herein and with active gust load alleviation (GLA). The results showed that the wing critical bending moments were reduced when one of the embodiments of the wing tip device disclosed herein was used on the wing tip. The results further showed that the wing critical bending moments were reduced passively by approximately 15% (no active control or actuation) when one of the embodiments of the wing tip device disclosed herein was used on the wing tip of the wing, and that the wing critical bending moments were reduced actively by approximately 50% (active control and actuation) when one of the embodiments of the wing tip device disclosed herein was used on the wing tip of the wing. Such reduction in wing bending moments can result in significant reduction in wing weight which improves the overall weight of the air vehicle, and can result in a significant increase in flight performance and safety when flying in atmospheric gusts.

Figure 14:
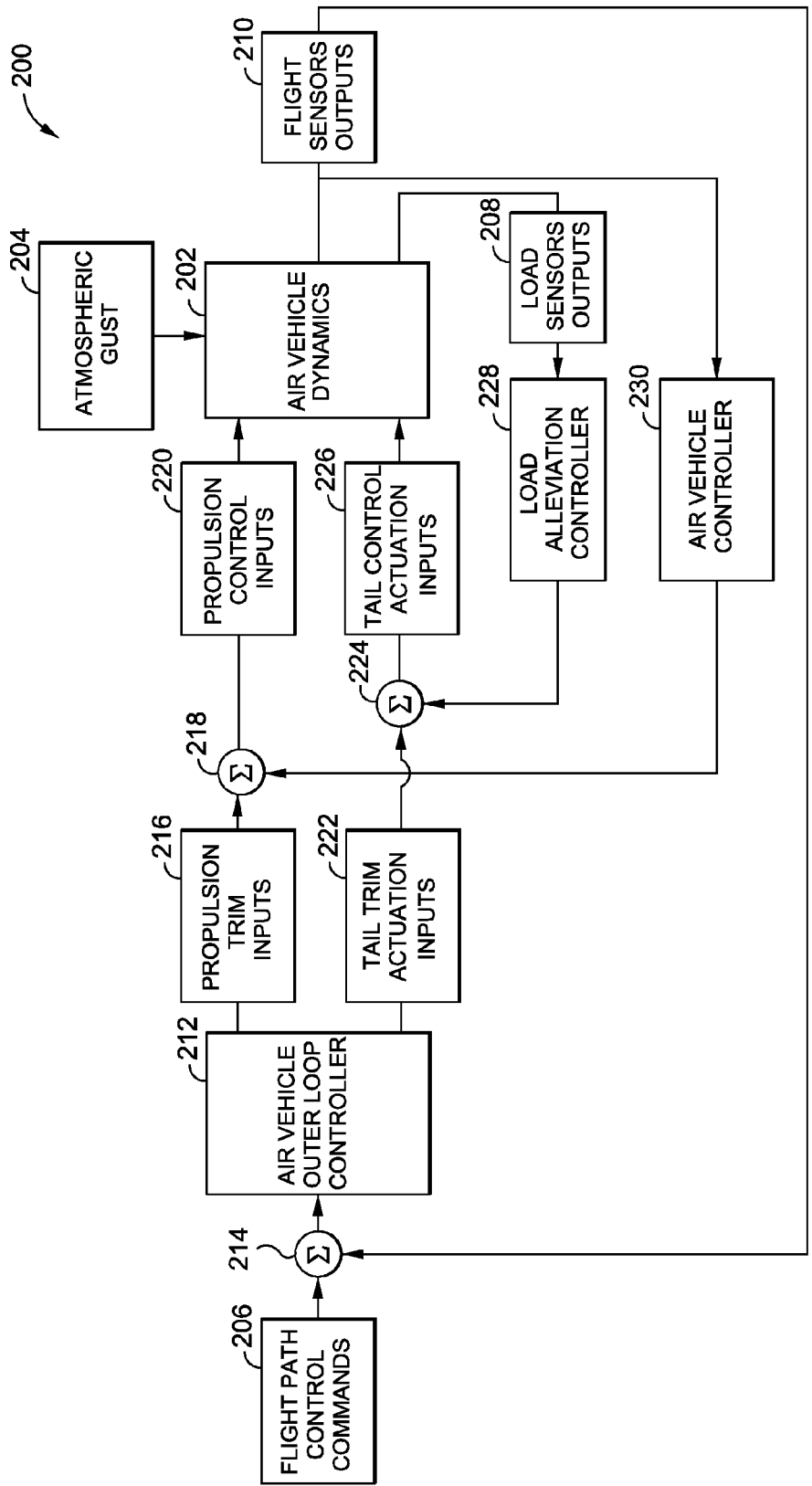
FIG. 14 is an illustration of a schematic diagram of one of the embodiments of a load alleviation system of the disclosure.

In another embodiment of the disclosure, there is provided a load alleviation system 200 for air vehicle and load alleviation control in an air vehicle. FIG. 14 is an illustration of a schematic diagram of one of the embodiments of the load alleviation system 200 of the disclosure. In the load alleviation system 200, air vehicle dynamics 202, such as for example, rigid body modes and natural flexible modes, and structural loads/deflections, responding to atmospheric gust 204 or turbulence, and flight path control commands 206, are sensed by wing load sensors 52 (see FIG. 3), such as for example, strain gages, accelerometers, fiber optic sensors, or another suitable sensor device, and are sensed by flight sensors 54 (see FIG. 3), such as for example, air data, inertial, air vehicle speed, angles of attack, altitude or air density, accelerations, rotation rates, or another suitable sensor. The wing load sensors 52 transmit load sensors outputs 208 to a load alleviation controller 228. The load alleviation controller 228 controls wing loads and wing bending moments by commanding actuation of the tip tail element 58 (see FIG. 3) relative to the wing load sensors 52. The flight sensors 54 transmit flight sensors outputs 210 to an air vehicle controller 230. The air vehicle controller 230 controls the air vehicle dynamics 202, assuring a stable and well damped system by controlling propulsion control inputs 220 (allowing for a propulsion-only air vehicle controller). The flight path control commands 206 are input and summed by summation component 214 and are input into an air vehicle outer loop controller 212. The air vehicle outer loop controller 212 controls the aircraft flight path to its commanded flight path (altitude and turn rate) by commanding propulsion trim inputs 216 and tail trim actuation inputs 222. The propulsion trim inputs 216 are summed by summation component 218 and combined with propulsion control inputs 220 and input to the air vehicle dynamics 202. The tail trim actuation inputs 222 are summed by summation component 224 and combined with tail control actuation inputs 226 and input to the air vehicle dynamics 202. The output from the load alleviation controller 228 goes to the tail control actuators, and this includes both the wing tip device 10 (see FIG. 1) and the main tail 16 (see FIG. 1). The air vehicle outer loop controller 212, the load alleviation controller 228, and the air vehicle controller 230 collectively have and use control algorithms 232 (see FIG. 15) that are designed together to assure the different control functions, such as for example, flight path control, aircraft dynamics control, and wing load/deflection control, function together while meeting their combined requirements.

Figure 15:
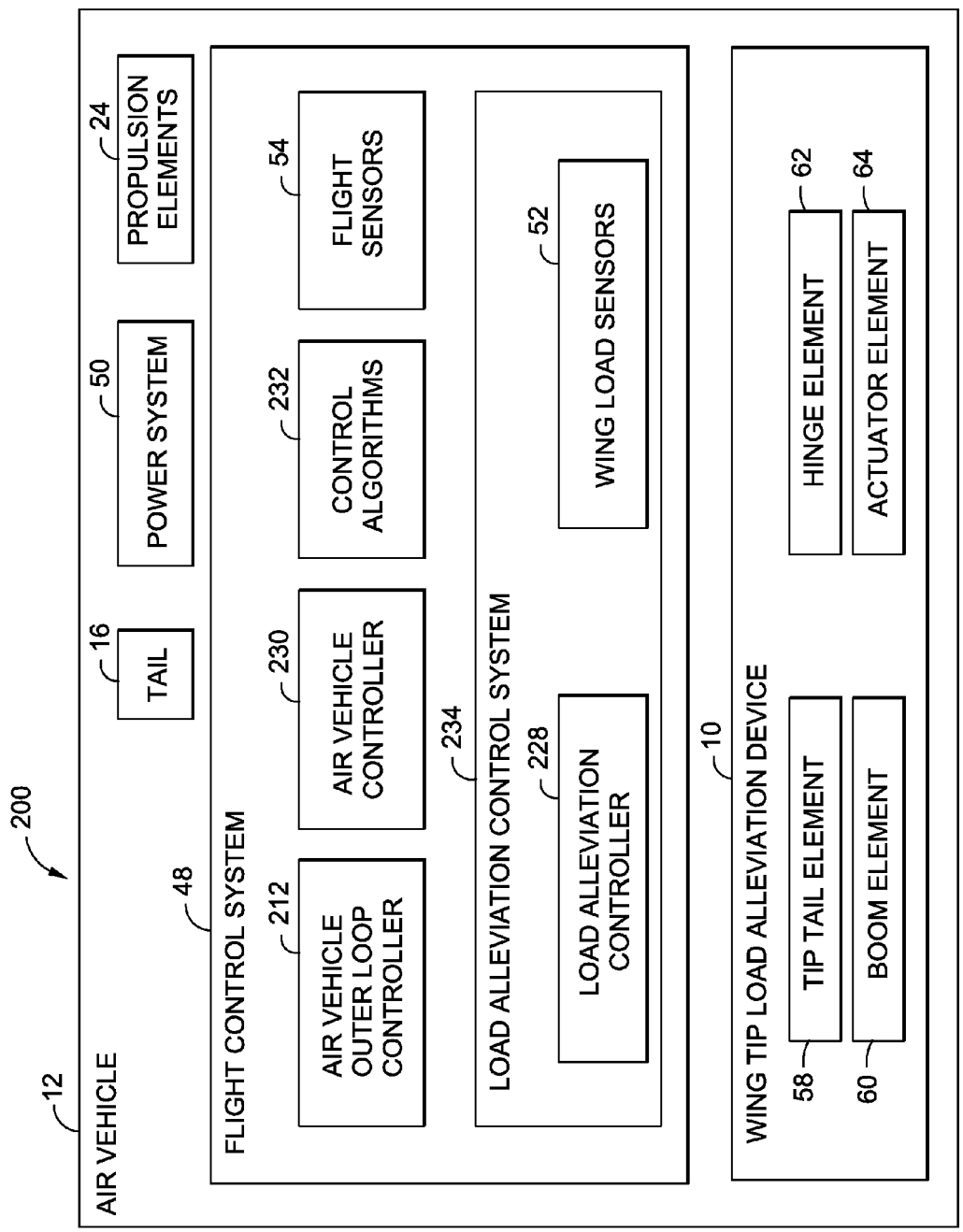
FIG. 15 is an illustration of a functional block diagram of a load alleviation system of the disclosure; and, FIG. 16 is an illustration of a flow diagram of an embodiment of a load alleviation method of the disclosure.

FIG. 15 is an illustration of a functional block diagram of the load alleviation system 200 for air vehicle and load alleviation in air vehicle 12 of the disclosure. The load alleviation system 200 comprises air vehicle 12 having power system 50 (see also FIG. 3) for providing power to and distributing power throughout the air vehicle 12. The air vehicle 12 further comprises tail 16 (see FIG. 1) and one or more propulsion elements 24 (see FIG. 1). As shown in FIG. 1, the air vehicle 12 may further comprise fuselage 14, nose 18, wing 20, and wing tip 22. The system 200 further comprises flight control system 48 (see also FIG. 3). The flight control system preferably comprises the air vehicle outer loop controller 212, the air vehicle controller 230, one or more flight sensors 54, one or more control algorithms 232, and a load alleviation control system 234. The load alleviation control system 234 comprises load alleviation controller 228 and one or more wing load sensors 52 that sense wing loads and wing deflections. The control algorithms 232 can use the wing load sensors 52 to determine a magnitude at which the wing of the air vehicle is being loaded. The air vehicle outer loop controller 212, the load alleviation controller 228, and the air vehicle controller 230 each have and use their own control algorithms 232 to assure the different control functions, such as for example, flight path control, aircraft dynamics control, and wing load/deflection control, function together while meeting their combined requirements. The system 200 further comprises wing tip load alleviation device 10 (see also FIGS. 3 and 6-9) attached to the wing tip 22 (see FIG. 1) of air vehicle 12. The wing tip load alleviation device 10 comprises tip tail element 58 extending outboard and aft of the wing tip 22, boom element 60 attaching the tip tail element 58 to the wing tip 22, hinge element 62 connecting a portion of the tip tail element 58 to a portion of the boom element 60 and allowing rotation of the tip tail element 58 about the boom element 60, and actuator element 64 connected to the hinge element 62. The load alleviation controller 228 controls wing loads and wing deflections by commanding actuation of the tip tail element 58 relative to the wing load sensors 52, resulting in alleviation of wing loads and wing deflections on the wing 20 of the air vehicle 12. The load alleviation controller 228 controls the wing tip load alleviation device 10 to provide at least approximately 50% active reduction in wing loads and wing deflections on the wing and at least approximately 15% passive reduction in wing loads and wing deflections on the wing. In one embodiment for the active load alleviation design, the tip tail element 58 is movable and the actuator element 64 is a linear actuator 104 (see FIG. 9) that rotates about the hinge element. In another embodiment for the active load alleviation design, the actuator element is a rotary actuator 126 (see FIG. 11). In one embodiment for the passive load alleviation design, the tip tail element 58 is rigidly attached and non-movable (see FIG. 12) and the hinge element 62 and the actuator element 64 are absent.

Figure 16:
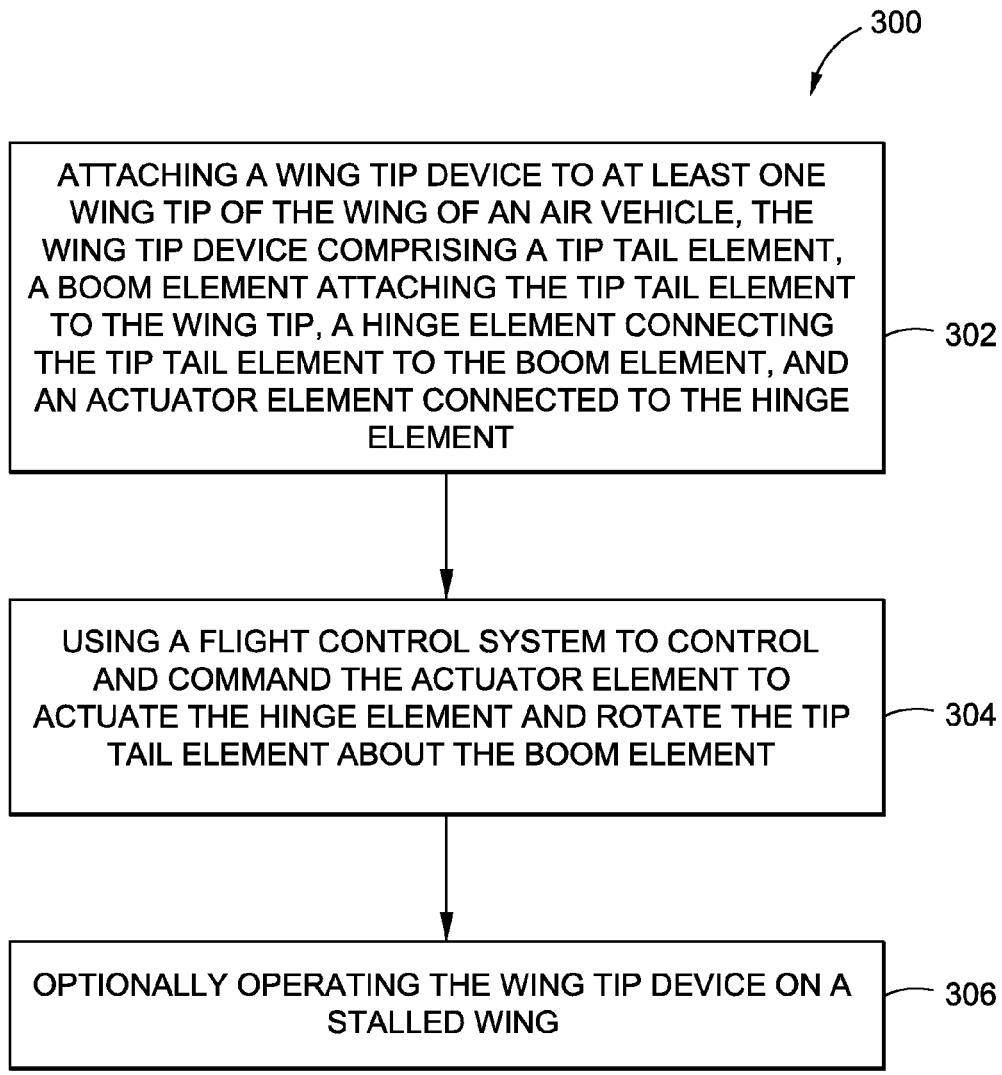

FIG. 16 is an illustration of a flow diagram of an embodiment of a load alleviation method 300 for use with a wing 20 of an air vehicle 12 (see FIG. 1). The method comprises step 302 of attaching one of the embodiments of the wing tip device 10 of the disclosure to at least one wing tip 22 of the wing 20 of the air vehicle 12 (see FIGS. 1-3). In one of the embodiments, as disclosed above and shown in FIG. 3, the wing tip device 10 comprises tip tail element 58 extending outboard and aft of the wing tip 22 of the air vehicle 12, boom element 60 attaching the tip tail element 58 to the wing tip 22, hinge element 62 connecting a portion of the tip tail element 58 to a portion of the boom element 60 and allowing rotation of the tip tail element 58 about the boom element 60, and actuator element 64 connected to the hinge element 62. The method further comprises step 304 of using a flight control system 48 to control and command the actuator element 64 to actuate the hinge element 62 and rotate the tip tail element 58 about the boom element 60. The wing tip device 10 actively controls and reduces wing loads and wing bending moments on the wing 20 of the air vehicle 12. The flight control system 48 has one or more control algorithms 232 (see FIG. 15) that use one or more wing load sensors 52 (see FIG. 3) to determine a magnitude at which the wing 20 is being loaded. The method may further comprise optional step 306 of operating the wing tip device 10 on a stalled wing. The wing tip device 10 when controlled by the flight control system 48 provides at least approximately 50% active reduction in wing loads and wing bending moments on the wing 20 and at least approximately 15% passive reduction in wing loads and wing bending moments on the wing 20. The tip tail element 58 preferably has an inboard end that lies within an elevation plane of a wing tip trailing vortex, resulting in a reduced net drag-due-to-lift of a combined load of the wing and the wing tip device (see FIG. 4). In one embodiment for the active load alleviation design, the tip tail element 58 is movable and the actuator element 64 is a linear actuator 104 (see FIG. 9) that rotates about the hinge element. In another embodiment for the active load alleviation design, the actuator element is a rotary actuator 126 (see FIG. 11). In one embodiment for the passive load alleviation design, the tip tail element 58 is rigidly attached and non-movable (see FIG. 12) and the hinge element 62 and the actuator element 64 are absent.

One or more of the embodiments of the wing tip device of the disclosure provides numerous advantages including a reduction of outboard wing or wing tip aerodynamic loading and a reduction of wing bending moments over the entire wing, thereby resulting in a reduction of critical wing stresses and/or weight and improved overall performance and/or flight safety of the air vehicle. The installation of one of the embodiments of the wing tip device of the disclosure provides passive and significant active load alleviation when controlled by the air vehicle flight control system. One or more of the embodiments of the wing tip device of the disclosure also reduces drag-due-to-lift of the wing to overcome the added drag and weight of the tip tail element and boom element, thus allowing a neutral performance impact before the load alleviation performance improvement or allowing a positive performance impact. Thus, one or more embodiments of the wing tip device of the disclosure can apply 100% of its load alleviation benefit to improving flight safety or weight reduction performance, and in particular, for gust-load dominated air vehicles and for solar powered air vehicles. Other suitable air vehicles may also benefit with the use of one of the embodiments of the wing tip device of the disclosure.

Many modifications and other embodiments of the disclosure will come to mind to one skilled in the art to which this disclosure pertains having the benefit of the teachings presented in the foregoing descriptions and the associated drawings. The embodiments described herein are meant to be illustrative and are not intended to be limiting or exhaustive. Although specific terms are employed herein, they are used in a generic and descriptive sense only and not for purposes of limitation.

What is claimed is:

1. A wing tip device for a wing of an air vehicle, the device comprising:
   a tip tail element;
   a boom element attaching the tip tail element to a wing tip, the boom element positioned inboard of the wing tip, the wing tip being at a terminal outer end of the wing;
   a hinge element connecting the tip tail element to the boom element; and,
   an actuator element connected to the hinge element, wherein one or more wing load sensors sense wing loads, and further wherein a flight control system controls the actuator element.

2. The device of claim 1 wherein the device reduces wing loads and wing bending moments on the wing.

3. The device of claim 1 wherein the one or more wing load sensors sense wing loads and wing bending moments for use in the flight control system to determine a magnitude at which the wing is being loaded.

4. The device of claim 1 wherein the flight control system controls and commands the actuator element to actuate the hinge element and rotate the tip tail element about the boom element.

5. The device of claim 1 wherein the tip tail element extends outboard and aft of the wing tip, the tip tail element having an inboard end that lies within an elevation plane of a wing tip trailing vortex, resulting in a reduced net drag-due-to-lift of a combined load of the wing and the wing tip device.

6. The device of claim 1 wherein the tip tail element is movable and the actuator element is a linear actuator that rotates about the hinge element.

7. The device of claim 1 wherein the actuator element actively controls an angle of attack of the tip tail element relative to existing air flow conditions.

8. The device of claim 1 wherein the wing tip device can operate on a stalled wing.

9. The device of claim 1 wherein the wing tip device, when controlled by the flight control system, provides at least approximately 50% active reduction in wing loads and wing bending moments on the wing and at least approximately 15% passive reduction in wing loads and wing bending moments on the wing.

10. An air vehicle comprising:
at least one fuselage;
at least one wing having at least one wing tip;
a flight control system;
a power system;
one or more wing load sensors connected to the flight control system and connected to the power system and used to sense wing loads and wing bending moments; and,
a wing tip load alleviation device attached to the at least one wing tip, the device comprising:
a tip tail element;
a boom element attaching the tip tail element to the wing tip, the boom element positioned inboard of the wing tip, the wing tip being at a terminal outer end of the wing;
a hinge element connecting the tip tail element to the boom element; and,
an actuator element connected to the hinge element, wherein the flight control system controls the actuator element.

11. The air vehicle of claim 10 wherein the wing tip load alleviation device reduces wing loads and wing bending moments on the wing.

12. The air vehicle of claim 10 wherein the flight control system controls and commands the actuator element to actuate the hinge element and rotate the tip tail element about the boom element.

13. The air vehicle of claim 10 wherein during flight the wing tip load alleviation device flies at a lower lift coefficient than the wing, resulting in an increased stall margin when a wind gust load increases a wing angle of attack.

14. The air vehicle of claim 10 wherein the wing tip load alleviation device, when controlled by the flight control system, provides at least approximately 50% active reduction in wing loads and wing bending moments on the wing and at least approximately 15% passive reduction in wing loads and wing bending moments on the wing.

15. The air vehicle of claim 10 wherein the flight control system has one or more control algorithms that use the one or more wing load sensors to determine a magnitude at which the wing is being loaded.

16. A load alleviation method for use with a wing of an air vehicle, the method comprising:
attaching a wing tip device to at least one wing tip of the wing of the air vehicle, the wing tip device comprising:
a tip tail element;
a boom element attaching the tip tail element to the wing tip, the boom element positioned inboard of the wing tip, the wing tip being at a terminal outer end of the wing;
a hinge element connecting the tip tail element to the boom element; and,
an actuator element connected to the hinge element; and,
using a flight control system to control and command the actuator element to actuate the hinge element and rotate the tip tail element about the boom element.

17. The method of claim 16 wherein the wing tip device actively controls and reduces wing loads and wing bending moments on the wing of the air vehicle.

18. The method of claim 16 wherein the flight control system has one or more control algorithms that use one or more wing load sensors to determine a magnitude at which the wing is being loaded.

19. The method of claim 16 wherein the wing tip device, when controlled by the flight control system, provides at least approximately 50% active reduction in wing loads and wing bending moments on the wing and at least approximately 15% passive reduction in wing loads and wing bending moments on the wing.

20. The method of claim 16 further comprising operating the wing tip device on a stalled wing.

21. The method of claim 16 wherein the tip tail element is movable and the actuator element is a linear actuator that rotates about the hinge element.

22. The method of claim 16 wherein the tip tail element extends outboard and aft of the wing tip, the tip tail element having an inboard end that lies within an elevation plane of a wing tip trailing vortex, resulting in a reduced net drag-due-to-lift of a combined load of the wing and the wing tip device.

23. A load alleviation system for an air vehicle, the system comprising:
a power system;
a flight control system; and,
a wing tip load alleviation device attached to at least one wing tip of a wing of the air vehicle, the device comprising:
a tip tail element;
a boom element attaching the tip tail element to the wing tip, the boom element positioned inboard of the wing tip, the wing tip being at a terminal outer end of the wing;
a hinge element connecting the tip tail element to the boom element; and,
an actuator element connected to the hinge element, wherein one or more wing load sensors sense wing loads, and further wherein the flight control system controls the actuator element.

24. The system of claim 23 wherein the wing tip load alleviation device reduces wing loads and wing bending moments on the wing.

25. The system of claim 23 wherein the flight control system comprises an air vehicle outer loop controller, an air vehicle controller, one or more flight sensors that sense air data, one or more control algorithms, and a load alleviation control system.

26. The system of claim 25 wherein the load alleviation control system comprises a load alleviation controller and the one or more wing load sensors that sense wing loads and wing deflections on the wing of the air vehicle.

27. The system of claim 26 wherein the load alleviation controller controls wing loads and wing deflections by commanding actuation of the tip tail element relative to the wing load sensors, resulting in alleviation of wing loads and wing deflections on the wing of the air vehicle.

28. The system of claim 26 wherein the load alleviation controller controls the wing tip load alleviation device to provide at least approximately 50% active reduction in wing loads and wing deflections on the wing and at least approximately 15% passive reduction in wing loads and wing deflections on the wing.

29. The system of claim 23 wherein the one or more wing load sensors sense wing loads and wing bending moments for use in the flight control system to determine a magnitude at which the wing is being loaded.

30. The system of claim 23 wherein the flight control system controls and commands the actuator element to actuate the hinge element and rotate the tip tail element about the boom element.

31. The system of claim 23 wherein the tip tail element is movable and the actuator element is a linear actuator that rotates about the hinge element.

32. The system of claim 23 wherein the system can be implemented to operate on a stalled wing.

\* \* \* \* \*